Patented June 14, 1927.

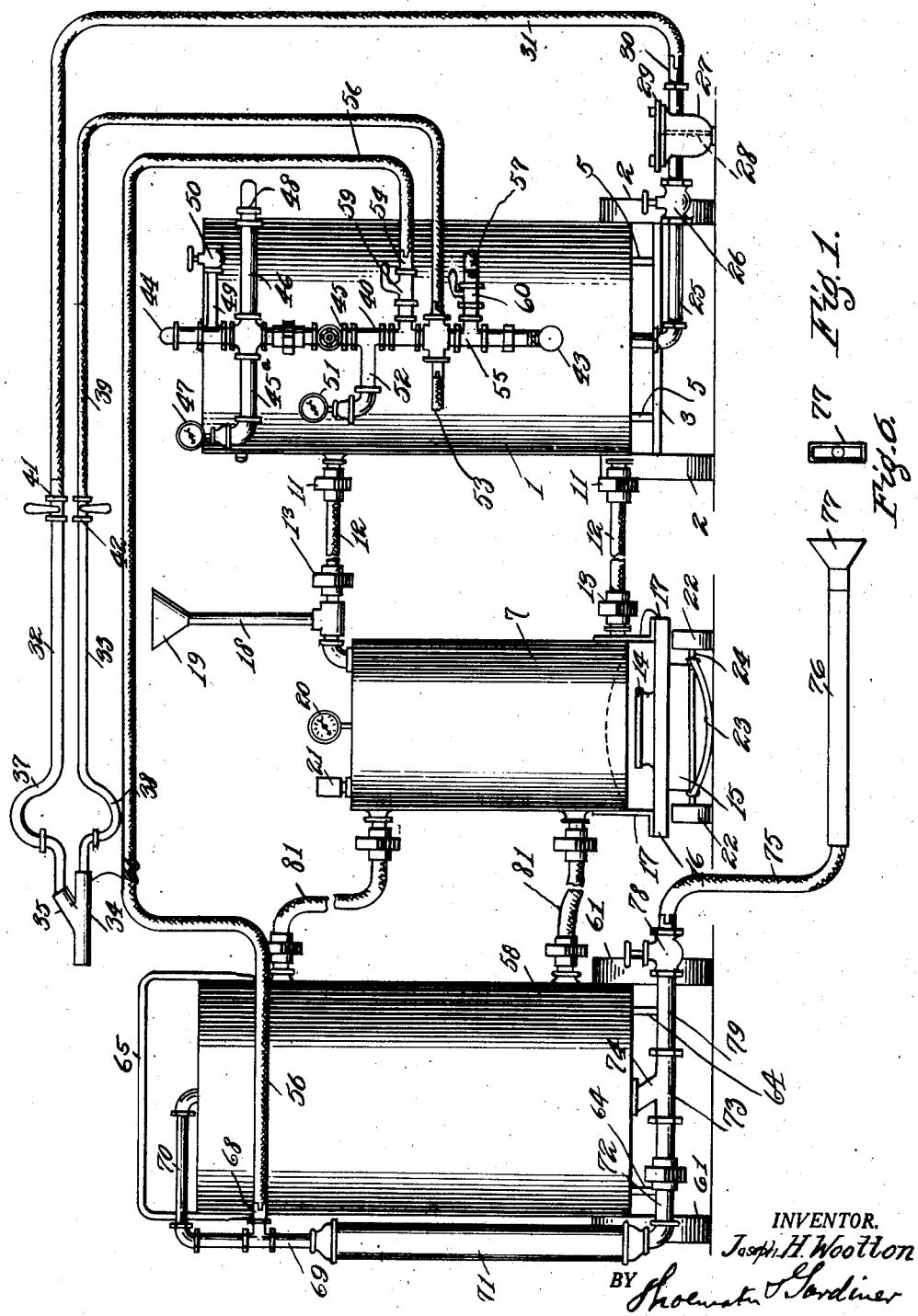

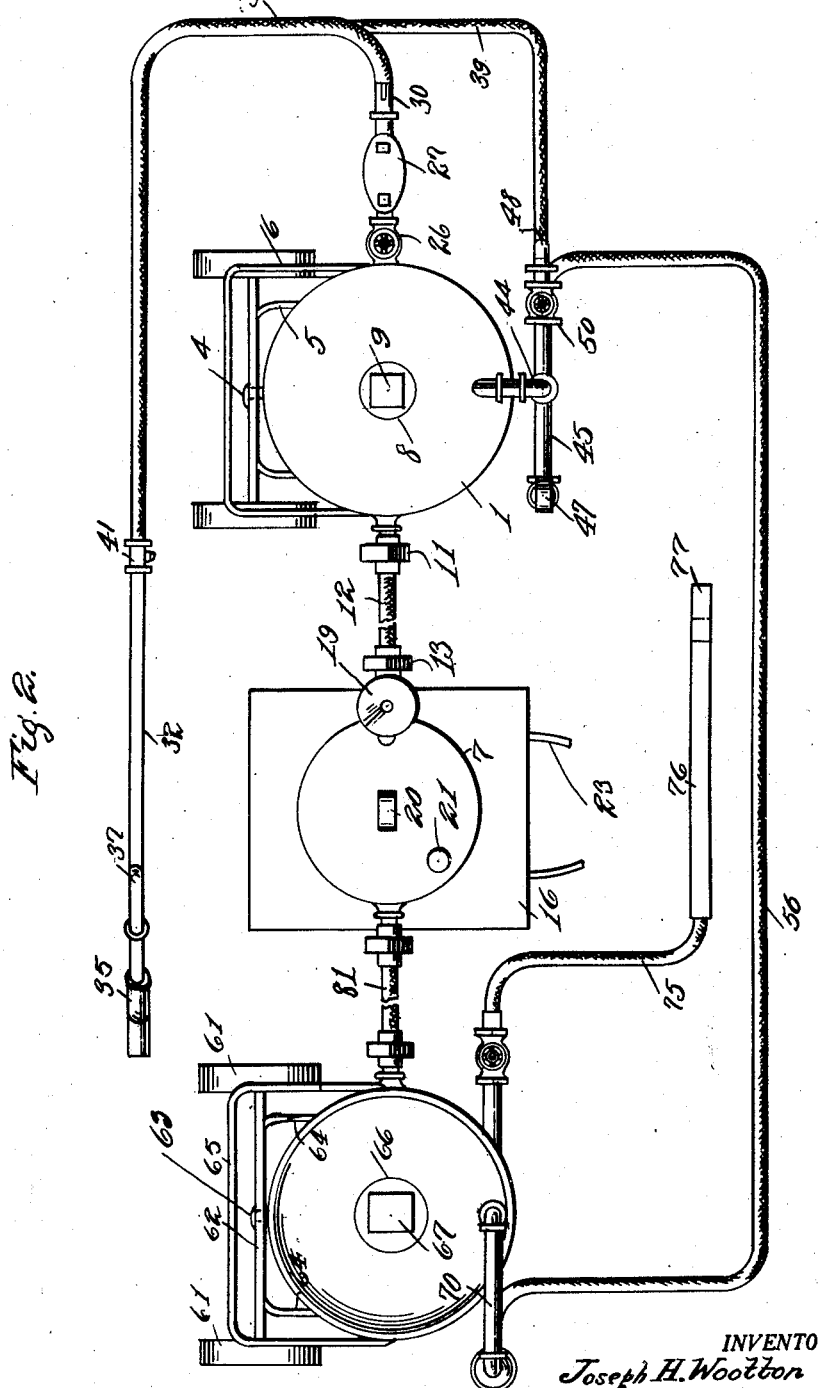

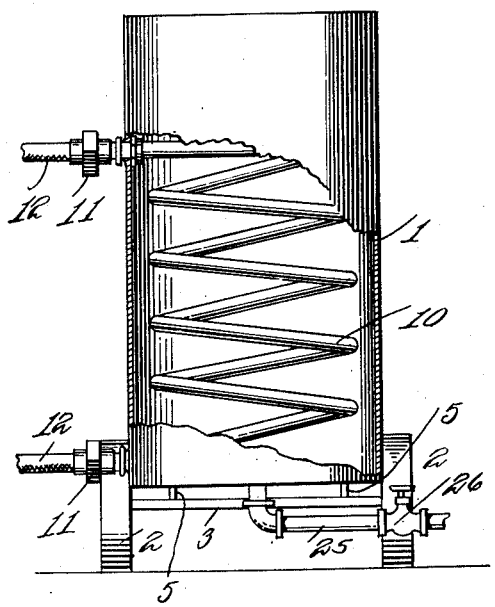
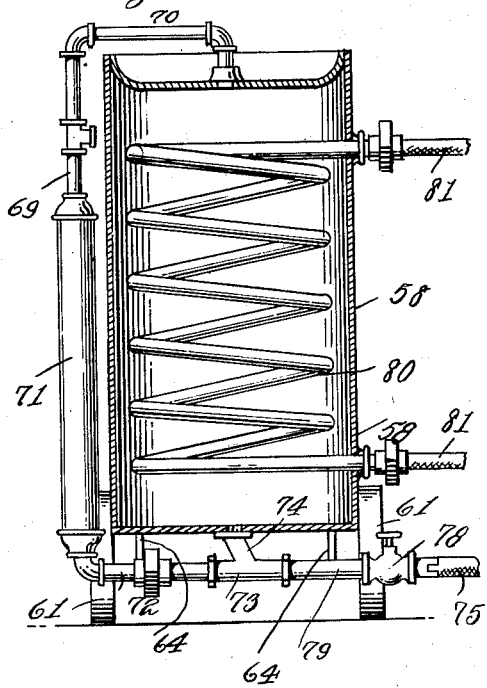
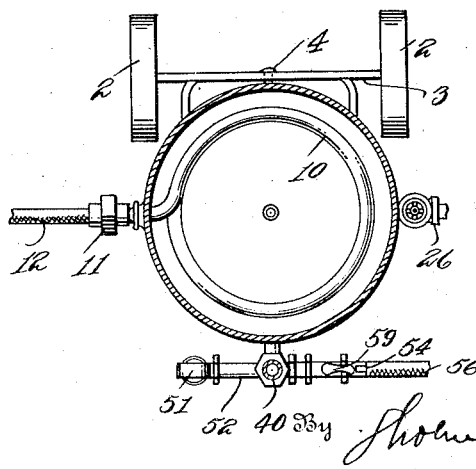

1,632,752

UNITED STATES PATENT OFFICE.

JOSEPH H. WOOTTON, OF WASHINGTON, DISTRICT OF COLUMBIA, ASSIGNOR TO THE PLY-RITE CONTRACTING COMPANY, OF BALTIMORE, MARYLAND.

PROCESS FOR COATING STRUCTURAL SURFACES.

Application filed February 19, 1926. Serial No. 89,358.

The invention relates to a process for coating structural surfaces with a moisture impervious fluid bond material and for air blasting upon such coating a layer or coating of a comminuted substance and partially embedding such comminuted substance in the moisture impervious material to present a roughened exterior for the reception of a finishing coating of material such as plaster, paint or the like.

The invention has for its object to spray a commercial product of the moisture impervious fluid bond material upon the said structural surfaces at a predetermined temperature to maintain the fluid material at a constant uniform fluid density irrespective of temperature changes of the atmosphere in hot and cold weather whereby a given quantity of the moisture impervious fluid bond material will always be distributed over substantially the same area to preserve the efficiency and uniformity of the coating at all times. Heretofore in the use of a commercial product of a moisture impervious fluid bond material composed of a mixture of asphaltum and petroleum products, the fluid density or viscosity of which changes with temperature changes, it has been necessary in cold weather to further cut the material by the addition of the petroleum ingredient thereby reducing or thinning the liquid with respect to the asphaltum ingredient and in extremely warm weather the moisture impervious fluid bond material is materially thinned by the heat of the atmosphere and the asphaltum element is correspondingly reduced in proportion. Under both of these conditions which frequently occur in summer and winter the amount of asphaltum in the coating applied to a structural surface is reduced and the efficiency of the coating is impaired and the necessity for repeated coatings arises. The primary purpose of the present invention is to obviate these difficulties arising from the use of a commercial product and insure uniformity and efficiency of the fluid body material in excluding moisture and preventing the same from affecting the finishing coat of plaster or other material applied to the structural surface.

Another object of the invention is to enable the air blasted coating of comminuted material to be applied to the coating of the moisture impervious fluid bond material at the same temperature as the latter so that the application of the comminuted material to the said coating will not in any way affect the consistency or fluid density of the coating or impair the moisture excluding properties of the same.

Another object of the invention is to provide a simple, practical and efficient apparatus of strong, durable and comparatively inexpensive construction adapted to enable the coating of moisture impervious fluid bond material and the layer of comminuted material to be successively applied to a structural surface at a predetermined uniform temperature under varying atmospheric conditions and temperature changes.

Another object of the invention is to enable the various units of the apparatus to be independently handled in transmitting the apparatus from one place to another and to be quickly assembled for use and readily moved as the work advances or progresses.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a side elevation of an apparatus constructed in accordance with this invention.

Fig. 2 is a plan view of the same.

Fig. 3 is an elevation of the liquid coating tank partly broken away to illustrate the arrangement of the temperature controlling coil.

Fig. 4 is a horizontal sectional view of the same.

Fig. 5 is a vertical sectional view of the sand coating tank.

Fig. 6 is a detail view of the sand nozzle.

In the accompanying drawings in which is illustrated the preferred embodiment of the invention 1 designates a tank designed to contain a moisture impervious fluid bond material constructed of suitable metal and preferably of cylindrical form but any other desired configuration may of course be employed. The tank is mounted upon wheels 2 located at the lower end of the tank and at the rear thereof and arranged on the journals of a transverse axle 3 secured to the back of the tank by a central fastening device 4 and side braces 5. The tank is provided at its upper portion with a handle 6 preferably in the form of a bail and extending rearwardly from the opposite sides of the tank as clearly illustrated in Fig. 2 of the drawing. The handle 6 and the wheels enable the tank 1 when disconnected from the reservoir or boiler 7 to be handled and manipulated similar to an ordinary truck and the said liquid coating tank may be tilted rearwardly and readily moved from one place to another. The tank is provided at the top with a filling orifice 8 normally closed by a screw plug 9 but any other suitable form of closure may of course be provided.

Within the tank is arranged a vertically disposed temperature controlling coil 10 composed of any desired number of convolutions and having its terminals extended through the wall of the tank at one side thereof and provided with suitable couplings 11 for enabling relatively short pieces of flexible hose 12 to be connected to the ends of the coil and the said pieces 12 of hose are arranged at the upper and lower portions of the tank 1 and are designed for connecting the coil with the reservoir or boiler 7, which is provided at its upper and lower portions with suitable couplings 13. The flexible hose 12 which may be of any desired length will enable the tank 1 and the reservoir or boiler 7 to be handled and moved practically as an independent unit even when the two are coupled together and while the ends of the coil 10 may be connected with the boiler or reservoir by a hose of any length a short hose is desirable and will render negligible any loss in temperature in the circulation of the fluid from the boiler or reservoir to the liquid coating tank 1 and back to the tank or reservoir after passing through the temperature controlling coil 10. In practice the moisture impervious fluid bond material is preferably a mixture of asphaltum and petroleum products with or without any other moisture resisting or liquefying materials and it has been found in practice that a temperature of approximately 83° Fahrenheit gives the best results in applying such a commercial product both as to the efficiency of the coating in resisting or excluding moisture and also with respect as to accuracy in applying the liquid coating to a structural surface. In order to enable this temperature to be maintained when the temperature of the atmosphere is below 83° Fahrenheit the boiler or reservoir 7 is equipped with a burner 14 and a suitable fuel tank 15 carried by a suitable truck 16 provided with brackets 17 which is secured to the boiler or reservoir at opposite sides thereof. The burner is located beneath the reservoir or boiler which may be provided with a concavo-convex surface as indicated in the drawing but any other construction of the boiler or reservoir may of course be employed and any preferred form of burner may of course be provided. The boiler or reservoir is provided at the coupling 13 with an upright or stand pipe 18 peferably provided at the upper end with a funnel 19 to facilitate filling the tank or reservoir and also to provide an outlet to the atmosphere in the water circulating system. The hot water will circulate through the upper hose into the upper end of the coil within the tank 1 and will flow downwardly through the coil and return to the boiler or reservoir 7 through the lower hose 12. The hot water will maintain the contents of the tank 1 at the desired temperature and the said tank or reservoir is equipped with a suitable gauge 20 for indicating pressure and temperature and with a relief valve 21 adapted to operate as a safety valve should the pressure become too great and the pipe 18 be insufficient to permit the necessary escape of steam to maintain the heater in a safe condition.

The truck which carries the boiler or reservoir 7 is provided with suitable wheels 22 and with a handle 23 preferably connected with the front axle 24. The platform or supporting portion of the truck 16 is rectangular as clearly shown in Fig. 2 of the drawing and the tank is preferably cylindrical. The rear axle is fixed and the front axle is pivoted but any desired form of truck may be employed as will be readily understood. The mounting of the boiler or reservoir upon a truck will enable it to be always maintained in an upright position so that the fuel tank and the burner will not be tilted in the handling of the temperature controlling means. In warm seasons of the year when the temperature rises above 83° Fahrenheit water of the desired temperature may be connected with the tank or reservoir and caused to flow through the coils of the liquid coating tank or the coil of the liquid coating tank may be connected directly with the water supply of a city when the temperature thereof is at the required degree and by flowing the water through the coil the material may be maintained at a lower temperature than the atmosphere. Usually the city water supply will enable the temperature to be controlled in warm weather and by delivering such water to the boiler or reservoir the latter may be used to modify the temperature of such water to produce the desired temperature in the temperature controlling coils of the liquid coating tank.

The liquid coating tank is provided at the bottom with a liquid outlet pipe 25 having a valve 26 and equipped with a liquid strainer trap 27 provided with a suitable straining element 28 adapted to intercept any solid which might clog the apparatus or interfere with the operation of the same. The liquid straining trap is provided with a removable cap or cover 29 to enable it to be readily changed at intervals or when required. The trap is located adjacent to the outer end of the outlet pipe 25 and the said outlet pipe 25 is provided with a suitable coupling 30 with which is connected a liquid coating hose 31 extending to a rigid tubular section 32 arranged substantially parallel and suitably connected with a rigid tubular section 33 for conducting air under pressure to a spray nozzle 34. The spray nozzle 34 is provided at the inner portion with divergent branches 35 and 36 which are pivotally connected with the outer ends 37 and 38. The end portions 38 are extended laterally in opposite directions and bent into approximately U-shape and receive the branches of the nozzle between them and a tight connection is provided between the branches and the ends and pipe sections 32 and 33 by providing a socket in one part and fitting the contiguous part in the socket. This will enable the nozzle to be turned at an angle to the rigid sections 32 and 33 and the latter form a convenient handle for operating the nozzle at a distance therefrom. The pipe section or rigid section 33 is connected by a flexible hose 39 with a compresed air manifold 40 and said rigid sections are provided at their inner ends with controlling or adjusting valves 41 and 42 for regulating the amount of the liquid and the amount of compressed air delivered to the nozzle.

The compressed air manifold 40 which is arranged exteriorly of the liquid coating tank preferably in an upright position at the front of the same is mounted at its lower end 43 on the said tank and is closed to the same at that point. The upper end of the compressed air manifold is connected by an elbow 44 with the liquid coating tank at the top thereof and communicates with the same and the said manifold is also provided at a point intermediate of its ends with a valve 45 for controlling the flow of fluid pressure into the liquid coating tank. The compressed air manifold is provided above the valve 44 with opposite arm 45 and 46 which carry respectively a pressure gauge 47 and a relief valve 48. The upper portion of the compressed air manifold is also provided with a laterally extending arm 49 having a manually operable valve 50 for enabling the pressure to be released when desired. The compressed air manifold is equipped below the valve 44 with an air pressure gauge 51 carried by a laterally extending arm 52 and adapted to indicate the pressure on the main air supply which is conducted to the compressed air manifold through a flexible hose 53 extending from the manifold to an air compressor or other suitable source of supply. The air hose of the nozzle 35 communicates with the compressed air manifold below the valve 44 and the said manifold is provided with suitable couplings 54 and 55 located below the valve 44 and adapted for the connection of flexible hose 56 and 57. The hose 56 extends to a sand coating tank 58 and the flow of fluid pressure through the hose 56 is controlled by a valve 59. Suitable couplings are provided for connecting the flexible hose 39 with the compressed air manifold and the coupling 55 is designed to be provided with a suitable valve 60 for controlling compressed air through the said hose 57. This will enable the compressed air to be used for a variety of purposes and the hose 57 may be connected with any suitable air operated device.

The sand coating tank which is preferably cylindrical is provided at the bottom with wheels 61 arranged at the lower rear portion of the tank similar to the wheels of the liquid coating tank and mounted on the ends of an axle 62 connected with the tank by a central fastening device 63 with side braces 64. A suitable handle 65 in the form of a bail similar to the handle 6 of the liquid coating tank is provided at the upper portion of the sand coating tank and is suitably secured to opposite sides of the same. The handle extends rearwardly from the sand coating tank and the latter is adapted to be operated in a manner similar to an ordinary wheeled truck. The sand coating tank is provided at the center of the top with a filling orifice 66 normally closed by a screw plug 67 and the said top is preferably concave at the upper face and is adapted to facilitate the introduction of sand or other comminuted material into the tank. The compressed air supply hose 56 is connected by a suitable coupling 68 with a rigid pipe section 69 having an arm or elbow 70 which is connected with the top of the tank and which communicates interiorly thereof above the sand. The fixed section 69 is located above and is connected with an enlarged reservoir section 71 designed to contain a relatively large volume of the compressed air and connected at the lower end by a horizontal arm 72 with a sand outlet 73 preferably in the form of an approximately T-shaped fitting. The sand outlet 73 is preferably in the form of an approximately T-shaped fitting having an inclined neck or branch 74 extending downwardly at an inclination and forming an acute angle with the portion of the arm or pipe 72 which is connected with the lower end of the reservoir section 71. This construction provides a sufficient volume of compressed air for forcing the sand from the nozzle through a flexible hose 75 which is connected with a sand gun 76 consisting of a rigid tubular section and a tapered discharge nozzle 77. The tapered discharge nozzle 77 has a rectangular outlet as shown in Fig. 5 but any other form of outlet may of course be provided. The compressed air admitted to the top of the tank forces the sand through the outlet 74 and the compressed air from the reservoir 71 will carry the air to the discharge gun and cause a blasting of sand to be projected therefrom as will be readily understood. The discharge of the sand blast is controlled by a valve 78 carried by a horizontal pipe 79 extending from the sand outlet 73.

The sand discharge from the sand coating tank is maintained at the same temperature as the liquid discharge from the tank 1 by means of the temperature controlling coil 80 arranged vertically within the sand coating tank 58 and connected by upper and lower flexible hose 81 with the boiler or reservoir 7. The temperature controlling liquid will circulate through the coil of the sand coating tank and the temperature of the sand will be maintained uniform with the temperature of the moisture impervious fluid bond material of the liquid coating tank so that the sand air blasted in a layer upon the coating of the liquid material from the tank 1 will be of the same temperature as the said coating and will not impair the efficiency thereof as might be the case where a layer of material of a different temperature is partially embedded in the said coating.

The sand or other comminuted material provides a rough surface and serves as a key to receive the finishing coating and it interlocks the same with the binder or viscous material and securely holds the finishing coating at walls, ceilings and other places. Stucco, plaster or other finishing coating is permanently keyed or secured to the viscous moisture impervious fluid bond material in such a manner as to positively prevent cracking, staining or the separation or deterioration of the finishing coating from the bonding material.

Any desired proportion of the asphaltum and petroleum products may be applied to various surfaces and the proportion may be maintained by controlling the temperature of the mixture and applying the same at a uniform temperature so that the viscous material will not be affected by temperature changes of the atmosphere. Also it will be clear that by maintaining a higher or lower constant temperature the consistency of the viscous material may be controlled so that the proper consistency and the desired fluid density may be maintained constant in the application of the same to the surface to which it is to be applied.

What I claim is:

1. A method of coating structural surfaces consisting of spraying upon the same by compressed air a liquid material composed of a mixture of asphaltum and petroleum products, controlling the temperature of the said material while it is being sprayed upon the surface to maintain a constant uniform fluid density of the material and a uniform application of the same to the surface irrespective of atmospheric temperature changes and air blasting upon said coating a layer of sand substantially the same temperature as the sprayed material.

2. A method of coating structural surfaces consisting in spraying upon said surfaces by compressed air a viscous material, maintaining the material at a predetermined temperature irrespective of atmospheric temperature changes to maintain a uniform fluid density of the same while it is being applied to the surface and embedding in said coating a layer of comminuted material of substantially the same temperature as the viscous material.

In testimony whereof I have hereunto set my hand.

JOSEPH H. WOOTTON.